United States Patent
Bedingfield, Sr. et al.

(10) Patent No.: US 7,274,784 B2
(45) Date of Patent: Sep. 25, 2007

(54) METHODS, SYSTEMS, AND COMPUTER PROGRAM PRODUCTS FOR ROUTING CALLS BASED ON THE ORIGINATING NETWORK

(75) Inventors: James Carl Bedingfield, Sr., Lilburn, GA (US); George Jung, Cumming, GA (US)

(73) Assignee: AT&T BLS Intellectual Property, Inc., Wilmington, DE (US)

( * ) Notice: Subject to any disclaimer, the term of this patent is extended or adjusted under 35 U.S.C. 154(b) by 836 days.

(21) Appl. No.: 10/701,049

(22) Filed: Nov. 4, 2003

(65) Prior Publication Data

US 2004/0228466 A1 Nov. 18, 2004

Related U.S. Application Data

(60) Provisional application No. 60/497,786, filed on Aug. 26, 2003.

(51) Int. Cl.
*H04M 7/00* (2006.01)

(52) U.S. Cl. ............ 379/219; 379/220.01; 379/221.01; 379/265.02; 379/265.09

(58) Field of Classification Search ................ 379/219, 379/220.01, 221.01, 265.02, 265.09
See application file for complete search history.

(56) References Cited

U.S. PATENT DOCUMENTS

| | | | | |
|---|---|---|---|---|
| 5,848,131 | A * | 12/1998 | Shaffer et al. | 379/88.2 |
| 5,867,562 | A * | 2/1999 | Scherer | 379/88.21 |
| 6,654,451 | B1 * | 11/2003 | Ward | 379/114.24 |
| 2001/0028711 | A1 * | 10/2001 | Antonucci et al. | 379/245 |

* cited by examiner

*Primary Examiner*—Quynh H. Nguyen
(74) *Attorney, Agent, or Firm*—Myers Bigel Sibley & Sajovec, P.A.

(57) ABSTRACT

A method of routing calls in a communication system. A call is received from an originating network in the communication system. The identity of the originating network is determined, and the call is routed in the communication system based on the identity of the originating network.

24 Claims, 4 Drawing Sheets

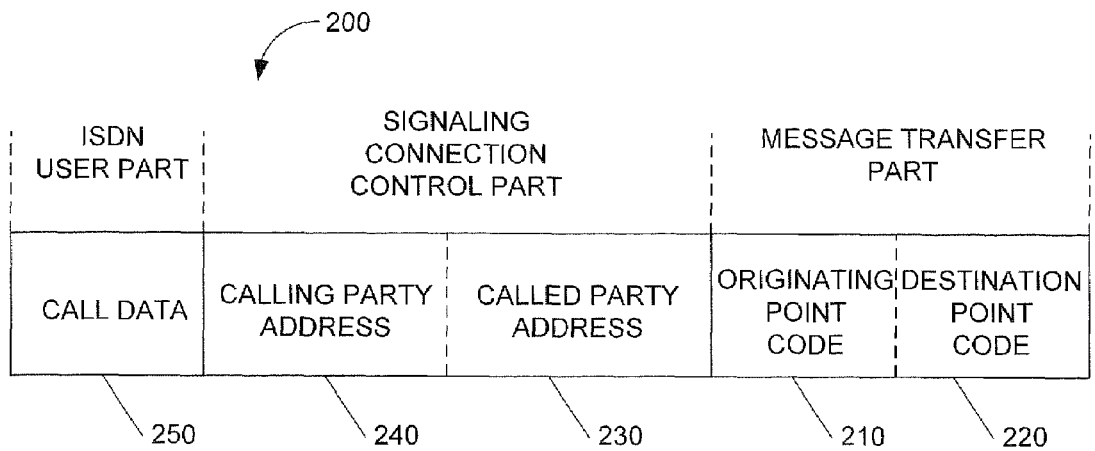

*Figure 2*

| Network ID Table ||
|---|---|
| Network IDs (Point Codes) | Routing Number Tables |
| Network ID 1 | Routing Number Table 1 |
| Network ID 2 | Routing Number Table 2 |
| Network ID 3 | Routing Number Table 3 |
| Network ID 4 | Routing Number Table 4 |

*Figure 3*

| Routing Number Table |||
|---|---|---|
| Toll-Free Nos. | Alternate Carrier Identification Codes (CICs) | Alternate Phone Nos. |
| Toll-Free No. 1 | CIC 1 | Phone No. 1 |
| Toll-Free No. 2 | CIC 2 | Phone No. 2 |
| Toll-Free No. 3 | CIC 3 | Phone No. 3 |
| Toll-Free No. 4 | CIC 4 | Phone No. 4 |

*Figure 4*

METHODS, SYSTEMS, AND COMPUTER PROGRAM PRODUCTS FOR ROUTING CALLS BASED ON THE ORIGINATING NETWORK

CROSS-REFERENCE TO PROVISIONAL APPLICATION

This application claims the benefit of provisional Application No. 60/497,786, filed Aug. 26, 2003, entitled METHODS, SYSTEMS, AND COMPUTER PROGRAM PRODUCTS FOR ROUTING CALLS BASED ON THE ORIGINATING NETWORK, the disclosure of which is hereby incorporated herein by reference in its entirety as if set forth fully herein.

FIELD OF THE INVENTION

The present invention generally relates to the field of switched telephony, and more particularly to systems and methods for routing calls in a communication system.

BACKGROUND OF THE INVENTION

Subscribers of toll-free long-distance services are generally provided a pair of telephone numbers that can be used by callers to call the subscriber without cost to the caller. For example, one of the telephone numbers may have an area code of the subscriber's region (i.e., an "in-region" number), and the other telephone number may have an 800 area code (i.e., an "out-of region" number). Callers who are within the same region as the subscriber may then use the in-region number so that the call is routed within the region to reduce the subscriber's costs. Callers who are outside of the subscriber's region may use the out-of-region number to call the subscriber, and with the costs of the call being charged to the subscriber.

However, under this approach for toll-free long-distance services, a telecommunications carrier needs to allocate a pair of numbers to each subscriber, the subscriber needs to publish both numbers to its callers, and callers need to determine whether they are within the same region as the subscriber when choosing which number to use to make a call.

SUMMARY OF THE INVENTION

Embodiments of the present invention route calls in a communication system. A call is received from an originating network in the communication system. The identity of the originating network is determined, and the call is routed in the communication system based on the identity of the originating network. In some embodiments of the present invention, when a called number is a toll-free long-distance number that is associated with a predetermined telecommunications carrier, and when the call originated from a network that is also associated with the predetermined telecommunications carrier, the call is routed differently in the communications system than if the toll-free long-distance number and/or the originating network are not associated with a common telecommunications carrier.

The association between a called number and a telecommunications carrier may be determined by, for example, comparing a called party address in a SS7 data packet call query to a list of call numbers that are associated with the telecommunications carrier. The association between an originating network and a telecommunications carrier may be determined by, for example, comparing an originating point code in a SS7 call query to a list of networks that are associated with the telecommunications carrier.

A call may thereby be routed differently depending on, for example, whether a call originated from a network that is associated with a common telecommunications carrier as that which is associated with the called number (e.g., the same telecommunications carrier or associated telecommunications carriers), or from a network that is associated with a different telecommunications carrier (e.g., a competitive local exchange carrier).

When the called number and the originating network are associated with a common telecommunications carrier, the call may be routed to, for example, a subscriber location that is in the same region as the caller ("in-region") over, for example, one or more networks that are associated with the common telecommunications carrier. In contrast, when the called number and/or the originating network are associated with different telecommunications carriers, the call may be routed to a subscriber location that is possibly outside the region of the caller ("out-of-region"), by, for example, routing the call in a conventional manner. A telecommunications carrier may thereby provide toll-free long-distance services using the same number for "in-region" callers and "out-of-region" callers.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

FIG. 2 is a diagram of a Signaling System 7 message format.

FIG. 3 illustrates a data structure of a network ID table according to some embodiments of the present invention.

FIG. 4 illustrates a data structure of a routing number table according to some embodiments of the present invention.

DETAILED DESCRIPTION OF THE INVENTION

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

It also will be understood that, as used herein, the term "comprising" or "comprises" is open-ended, and includes one or more stated elements, steps and/or functions without precluding one or more unstated elements, steps and/or functions.

The present invention is described below with reference to block diagrams and/or operational illustrations of methods and systems according to embodiments of the invention. It is understood that each block of the block diagrams and/or operational illustrations, and combinations of blocks in the block diagrams and/or operational illustrations, can be implemented by analog and/or digital hardware, and/or computer program instructions. These computer program instructions may be provided to a processor of a general purpose computer, special purpose computer, ASIC, and/or other programmable data processing apparatus in a system, such that the instructions, which execute via the processor of the computer and/or other programmable data processing apparatus, create means for implementing the functions/acts specified in the block diagrams and/or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

It should be understood, that, as used herein, the term "wireless terminal" may include a cellular radiotelephone with or without a multi-line display; a pager; a Personal Communications System (PCS) terminal that may combine a cellular radiotelephone with data processing, facsimile and data communications capabilities; a Personal Data Assistant (PDA) that can include a radiotelephone, pager, Internet/intranet access, Web browser, organizer, calendar and/or a global positioning system (GPS) receiver; and a conventional laptop and/or palmtop portable computer that includes a radiotelephone or other transceiver.

Figure 1:
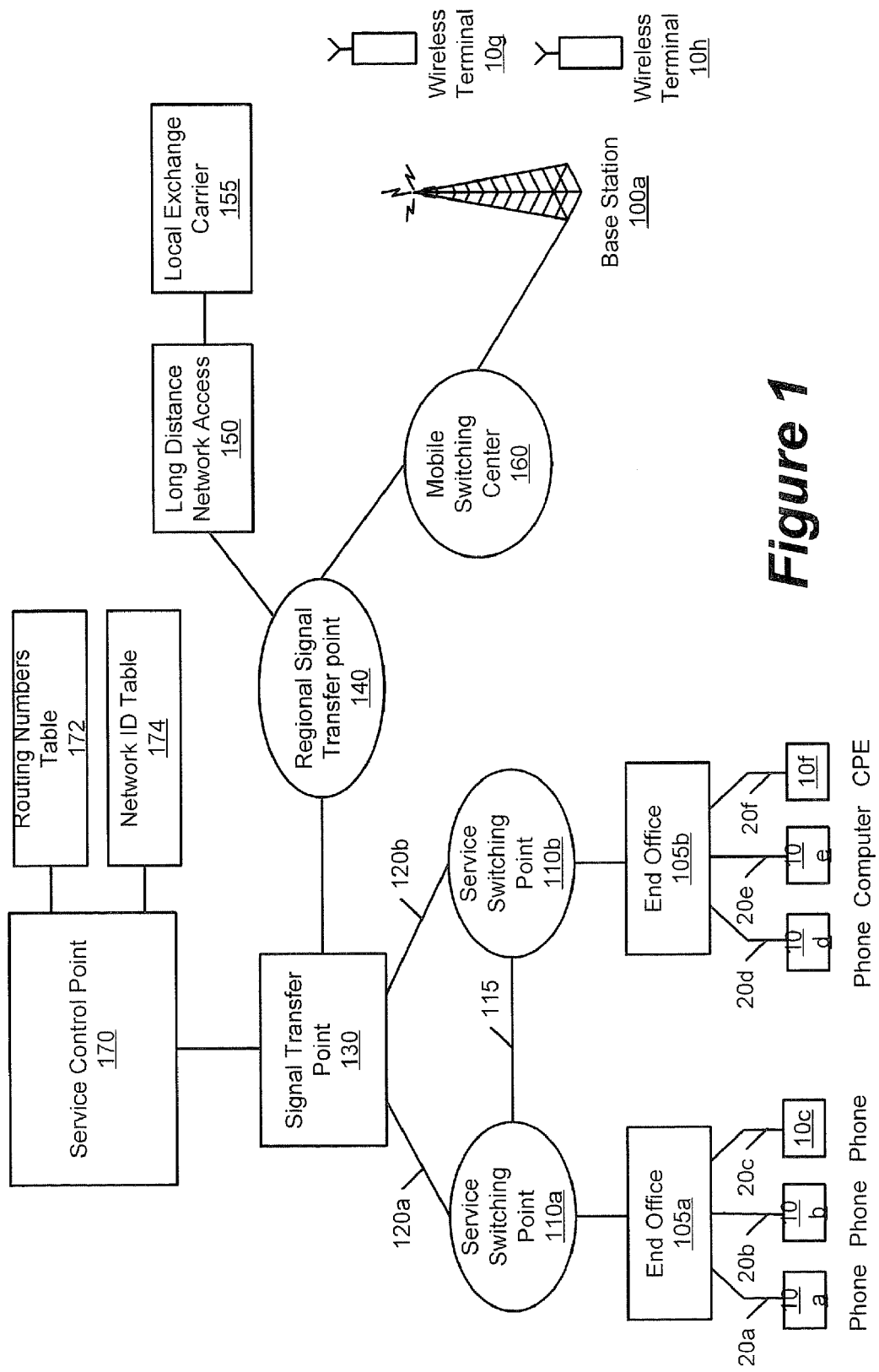
FIG. 1 is a block diagram of a communications system according to some embodiments of the present invention.

FIG. 1 is a block diagram of a communications system for routing calls between communication devices according to various embodiments of the present invention. The representative communication devices shown in FIG. 1 include phones 10a-d, a computer 10e, and other consumer premises equipment (CPE) 10f that are connected to the communications system by subscriber telephone lines 20a-f, and wireless terminals 10g-h that are connected to the communications system by wireless communication channels serviced by a base station 100. It will be understood that each of the subscriber telephone lines 20a-f may be connected to a plurality of communication devices.

End office switches 105a and 105b are connected to serviced subscriber telephone lines 20a-c and 20d-f, respectively, and serve as gateways between the communication devices 10a-f and service switching points (SSPs). For example, representative SSPs 110a-b route communications to, from, and/or between the communication devices 10a-c and 10d-f, respectively, via the end offices 105a and 105b, respectively, and the subscriber telephone lines 20a-c and 20d-f, respectively. The SSPs 110a-b are interconnected by a network of high capacity circuits known as "trunks" 115, and are connected to a signal transfer point 130 via respective data links 120a-b. The data links 120a-b may employ a signaling protocol referred to as CCITT Signaling System 7 (SS7). The signal transfer point 130 may be a multi-port high speed packet switch that responds to routing information in data packets under the control of a service control point 170 to route calls to their intended destination. The service control point 170 serves as a switch controller by generating instructions for how the signal transfer point 130 is to route a call.

A regional signal transfer point 140 may connect the signaling transfer point 130 to a long distance network access device 150 and to a mobile switching center 160. The long distance network access device 150 may be connected via a long distance network to other local exchange carriers 155. The other local exchange carriers 155 may be associated with (e.g., owned by) the same telecommunications carrier that is associated with, for example, the SSPs 110a-b and signal transfer point 130 or may be associated with different telecommunications carriers (such as by competitor local exchange carriers, CLECS). The mobile switching center 160 can route communications between the wireless terminals 10g-h wireless terminals 10g-h that are serviced by the base station 100a and the signal transfer point 130 via the regional signal transfer point 140.

When a call from, for example, one of the communication devices 10a-c is received by the SSP 110a, the SSP 110a generates a query that is passed through the signal transfer point 130 to the service control point 170. The service control point 170 returns routing instructions that are used to route the call through the signal transfer point 130 to a destination in the communication system, such as to a subscriber's communication device.

The queries and responses between the SSPs 110a-b and the service control point 170, and between the mobile switching center 160 and the long distance network access 150 and the service control point 170, may be communicated via the SS7 protocol using data packets. An exemplary query 200 according to the SS7 protocol is shown in FIG. 2. The query 200 includes a Message Transfer Part (MTP), a Signaling Connection Control Part (SCCP), and an ISDN User Part (ISUP). The MTP provides information for routing messages. The SCCP provides additional routing and management information for transferring messages, other than call setup. The ISUP provides information for transfer of call set-up signaling information. Each of the SSPs 100a-b, SSPs in the local exchange carriers 155, and the mobile switching center 160, have a point code that uniquely identifies the SSP.

In this example, the SSP 110a receiving the call inserts its point code into an Originating Point Code (OPC) field 200 of the MTP, and inserts information relating to the signal transfer point 130 in the Destination Point Code (DPC) field 210 of the MTP. The OPC field 200 and the DPC field 210 form a routing label for a call query to the service control point 170. The called telephone number is inserted into a called party address field 220. The query 200 also includes a calling party address field 240 and a call data field 250.

The operation of SSPs, signal transfer points, service control points and other components of an advanced intelligent network and the signaling therebetween is further described in U.S. Pat. No. 5,701,301 to Weisser, Jr., which is incorporated by reference herein in its entirety.

According to various embodiments of the present invention, the service control point 170 generates routing instructions for routing a call through the communication system based on information in a call query, and communicates the routing instructions as a response to a call query. The routing instructions are based on the identity of the originating network of the call, and may be based on the called number to which the call is directed. The originating network of a call may be determined from the originating point code 210 (FIG. 2) in the SS7 data packet of a call query to the service control point 170. The called number may be determined from the called party address 230 (FIG. 2) in the call query.

A call may thereby be routed differently depending on, for example, whether the call originated from a network that is associated with a common telecommunications carrier as that which is associated with the called number (e.g., the same telecommunications carrier or associated telecommunications carriers), or from a network that is associated with a different telecommunications carrier (e.g., a CLEC).

The service control point 170 may include one or more routing number tables 172 and a network ID table 174, which may be used to determine an association between an originating network and a carrier, and between a called number and a carrier. The routing number table 172 may include associations between call numbers, which are associated with one or more carriers, and alternate numbers to which called numbers may be routed. The network ID table 174 may include one or more network identities that are associated with the carrier, and may include an association to one or more routing number tables. The service control point 170 may then compare a called number to the numbers in the routing number table 172 to determine whether the called number is associated with the carrier, and may compare the identity of the originating network to the networks in the network ID table 174 to determine whether the originating network of a call is associated with the carrier. The service control point 170 may then generate routing instructions for routing the call in the communication system based on one or both of these determinations.

FIG. 3 illustrates a data structure of an exemplary network ID table, which may be used as the network ID table 174 of FIG. 1, according to some embodiments of the present invention. The data structure includes a network IDs field and a routing number tables field. The network IDs field may include a list network IDs that are associated with one or more known carriers. The network IDs field may contain entries that identify a network, a network and a cluster, and/or member. A more specific entry in the network IDs field may take precedence for routing a call over a less specific entry. For example, the network IDs field may contain the following entries: 252-003-001; 252-003-002; 252-006-006; 252-004; 252-005; and 252, and with routing tables identified by the following corresponding entries: 252-003-001; 252-003-002; 252-006-006; 252-004; 252-004; and 252. The routing number tables field may identify one or more routing number tables that correspond to listed network IDs, and which may be used to route a call. Each of the routing number tables may correspond to a possible carrier, switch, and/or group of switches whose toll-free numbers may be routed differently than non-toll-free numbers. In this example, when a call query identifies a point code starting with 252, without additional specificity, the corresponding 252 routing table would be used for routing the call.

FIG. 4 illustrates a data structure of an exemplary routing call table, which may be used as the routing call table 172 of FIG. 1, according to some embodiments of the present invention. The data structure includes a toll-free number field (or other predefined phone number field), a carrier identification code (CIC) field, and an alternate phone numbers field. The data structure also associates toll-free numbers with the CICs and with the alternate phone numbers. The alternate phone numbers may correspond to, for example, Plain Old Telephone Service (POTS) type 10 digit numbers and/or toll-free or other numbers or identifiers. Accordingly, an associated CIC and alternate phone number, if available, may be determined based on a called number in a call query. The routing call table and/or the network ID table may be initially defined by an operator, and may be shared with other service control points. In some embodiments of the present invention, the alternative CIC may not be used for routing when a call query is associated with a "play-announcement" response.

Figure 5:
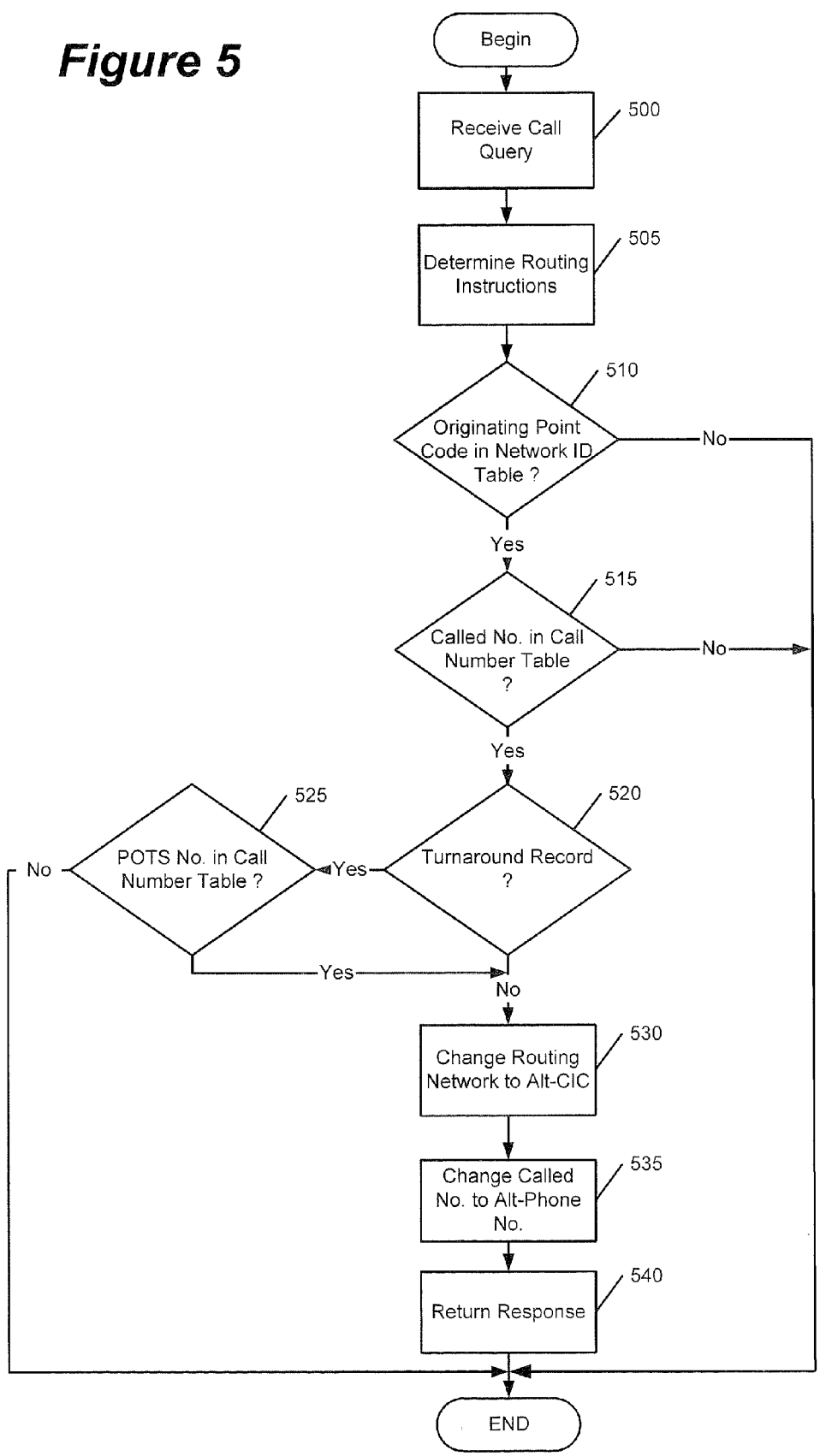
FIG. 5 is a flow chart illustrating operations for routing calls according to some embodiments of the present invention.

FIG. 5 is a flow chart that shows exemplary operations that may be performed by, for example, the service control point 170, alone or in combination with other components, for routing calls in the communication system based on the identity of the originating network of the call and the called number. At Block 500, a call query is received by, for example, a service control point. At Block 505, routing instructions are determined based on the call query such as, for example, based on the called party address (called number) and the destination point code in a SS7 call query. The routing instructions may include instructions for routing the call through the system, such as, for example, by identifying the routing network for the call. Instead of responding to the call query with routing instructions, a determination is made at Block 510 as to whether the call is from a network that is identified in a network ID table such as, by the originating point code in the SS7 call query. When the originating network is identified in network ID table, at Block 510, the associated routing number table is then identified from the network ID table. A determination is then made at Block 515 as to whether the called party address is identified in the corresponding routing number table, and, if so, an associated alternate phone number and associated alternate CIC would be identified from the routing number table that is associated with the identified originating network. According to some further embodiments of the present invention, a determination is also made in Block 515 as to whether the associated CIC in the call number table is a predetermined identifier (e.g., "0000"), and if so then routing instructions that are associated with the corresponding alternate phone number in the routing number table are used in a response to the call query to route the call.

When the called party address is identified in the routing number table, at Block 515, a determination is then made at Block 520 as to whether the alternate phone number is a turnaround record. A turnaround record occurs when the alternate phone number corresponds to a toll-free number, instead of to a POTS number. When it is a turnaround record, a determination is made at Block 525 as to whether the alternate phone number corresponds to another alternate phone number, such as to a POTS number, using the routing number table.

If the called party address is determined to not be a turnaround record, at Block 520, or is determined to be a turnaround record that corresponds to a POTS number, at Block 525, then at Block 530 the routing network that is identified in the routing instructions (generated at Block 505) is changed to the alternate CIC from the routing number table (identified at Block 515). At Block 535, the called party address in the routing instructions (generated at Block 505) is changed to the alternate phone number from the routing number table (identified at Block 515). At Block 540, the routing instructions are returned as a response to the call query.

When the originating network is not identified in network ID table, at Block 510, or when the called party address is not identified in the corresponding routing number table, at Block 515, or when the called party address is a turnaround record that corresponds to a toll-free number, at Block 525, the routing instructions that were generated at Block 505 are returned as a response to the call query.

Figure 6:
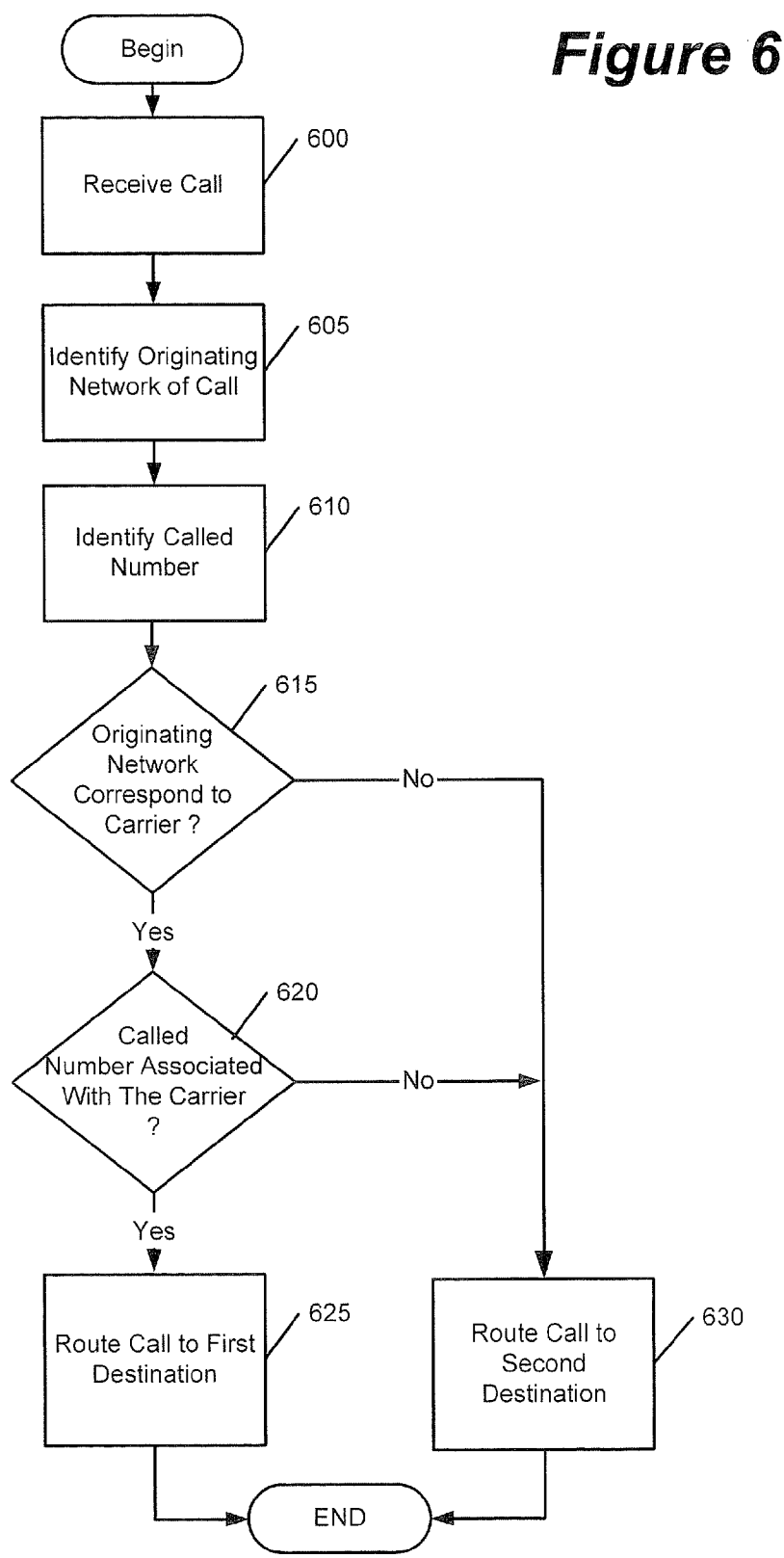
FIG. 6 is a flow chart illustrating operations for routing calls according to some embodiments of the present invention.

FIG. 6 is a flow chart that shows exemplary operations that may be performed by, for example, the service control point 170, alone or in combination with other components, for routing calls in the communication system according to some other embodiments of the present invention. At Block 600, a call is received by, for example, a service control point. At Block 605, the originating network of the call is identified from, for example, the originating point code of a call query. At Block 610, the called number is identified from, for example, the called party address in the call query. At Block 615, a determination is made as to whether the originating network corresponds to a predetermined network and, if so, then at Block 620 a determination is made as to whether the called number is associated with the predetermined carrier. If the called number is associated with the predetermined carrier, then at Block 625 the call is routed to a first destination. Otherwise, if the call did not originate from the predetermined network, at Block 615, or if the called number is not associated with the predetermined carrier, at Block 620, then the call is routed at Block 630 to a second destination that is different than the first destination.

Accordingly, a call may thereby be routed differently depending on whether the call originated from a network that is associated with a common telecommunications carrier as that which is associated with the called number, or from a network that is associated with a different telecommunications carrier. For example, when the called number is a toll-free long-distance call, such as an 800 prefix call, and the called number and the originating network are associated with a common carrier, the call may be routed to a subscriber location that is in the same region as the caller over one or more networks that are associated with the common carrier. In contrast, when the called number and/or the originating network are associated with different carriers, the call may be routed to a subscriber location that is possibly outside the region of the caller, by, for example, routing the call in a conventional manner. A carrier may thereby provide toll-free long-distance services using the same number for "in-region" callers and "out-of-region" callers, instead of assigning a pair of numbers, one number for use by "in-region" callers and a different number for use by "out-of-region" callers.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method of routing calls in a communication system, the method comprising:
   receiving a call from an originating network in the communication system;
   determining an identity of the originating network of the call; and
   routing the call in the communication system based on the identity of the originating network.

2. The method of claim 1, further comprising:
   identifying a called number to which the call is directed; and
   routing the call to a destination in the communication system based on the identity of the originating network and based on the called number.

3. The method of claim 2, wherein routing the call to a destination in the communication system based on the identity of the originating network and based on the called number comprises routing the call to a destination in the communication system based on whether the called number comprises a toll-free long-distance number that is associated with a predetermined telecommunications carrier, and based on whether the originating network identity is associated with the predetermined telecommunications carrier.

4. The method of claim 2, wherein the call is routed to a destination in the communication system based on a called party address in a SS7 call query.

5. The method of claim 1, further comprising:
   associating network identifications with phone numbers, alternate carrier identification codes, and alternate phone numbers;
   identifying a called number to which the call is directed; and
   identifying an alternate carrier identification code and an alternate phone number based on the identity of the originating network and the called number; and
   routing the call in the communication system based on the identified alternate carrier identification code and the identified alternate phone number.

6. The method of claim 1, wherein routing the call in the communication system based on the identity of the originating network comprises routing the call to a first destination when the identity of the originating network corresponds to a predetermined telecommunications carrier, and routing the call to a second destination when the identity of the originating network does not correspond to the predetermined telecommunications carrier.

7. The method of claim 1, wherein the call is routed in the communication system based on an originating point code in a SS7 call query.

8. The method of claim 7, further comprising routing the call to a destination in the communication system based on the originating point code and based on a called party address in the SS7 call query.

9. A communication system for routing calls, the communication system comprising:
   a switch that is configured to selectively couple calls between communication devices over networks; and
   a switch controller that is configured to determine an identity of a network from which a call originated, and that is configured to route the call through the switch to a destination communication device based on the identity of the originating network.

10. The communication system of claim 9, wherein the switch controller comprises a service control point.

11. The communication system of claim 9, wherein the switch controller is configured to identify a called number to which a call is directed, and is configured to route the call through the switch based on the identity of the network from which the call originated and based on the called number.

12. The communication system of claim 11, wherein the switch controller is configured to route the call through the switch based on whether the called number comprises a toll-free long-distance number and based on whether the identity of the network from which the call originated is associated with a predetermined telecommunications carrier.

13. The communication system of claim 12, wherein the switch controller is configured to route the call through the switch based on whether the called number comprises a toll-free long-distance number that is associated with the predetermined telecommunications carrier.

14. The communication system of claim 11, wherein the switch controller is configured to route the call based on a called party address in a SS7 call query.

15. The communication system of claim 11, wherein the switch controller is configured to determine an association between the called number to which the call is directed and a plurality of call numbers that are associated with a predetermined telecommunications carrier in response to the call, and is configured to route the call based on the determined association.

16. The communication system of claim 10, further comprising a database associating network identifications with phone numbers, alternate carrier identification codes, and alternate phone numbers, and wherein the switch controller is configured to identify a called number to which the call is directed, and is configured to identify an alternate carrier identification code and an alternate phone number based on the identity of the originating network and the called number, and is configured to route the call in the communication system based on the identified alternate carrier identification code and the identified alternate phone number.

17. The communication system of claim 10, wherein the switch controller is configured to route the call based on an originating point code in a SS7 call query.

18. The communication system of claim 17, wherein the switch controller is configured to route the call based on the originating point code and based on a called party address in the SS7 call query.

19. A tangible computer-readable storage medium comprising computer program code for routing calls in a communication system, the computer program code comprising:
   program code that is configured to receive a call from an originating network in the communication system;
   program code that is configured to determine an identity of the originating network of the call; and
   program code that is configured to route the call in the communication system based on the identity of the originating network.

20. The computer program product according to claim 19, further comprising:
   program code that is configured to identify a called number to which the call is directed; and
   program code that is configured to route the call to a destination in the communication system based on the identity of the originating network and based on the called number.

21. The computer program product according to claim 20, further comprising:
   program code that is configured to route the call to a destination in the communication system based on whether the called number comprises a toll-free long-distance number that is associated with a predetermined telecommunications carrier, and based on whether the originating network identity is associated with the predetermined telecommunications carrier.

22. The computer program product according to claim 20, wherein the program code that is configured to identify a called number to which the call is directed comprises program code that is configured to identify a called party address in an SS7 call query that is associated with the call, and further comprising program code that is configured to route the call based on the called party address.

23. The computer program product according to claim 19, wherein the program code that is configured to determine an identity of the originating network of the call comprises program code that is configured to identify an originating point code in an SS7 call query that is associated with the call, and further comprising program code that is configured to route the call based on the originating point code.

24. The computer program product according to claim 19, further comprising:
   program code that is configured to associating network identifications with phone numbers, alternate carrier identification codes, and alternate phone numbers;
   program code that is configured to identify a called number to which the call is directed;
   program code that is configured to identify an alternate carrier identification code and an alternate phone number based on the identity of the originating network and the called number; and
   program code that is configured to route the call in the communication system based on the identified alternate carrier identification code and the identified alternate phone number.

* * * * *